Aug. 14, 1934.  B. STOCKFLETH  1,970,024
BEARING SLEEVE
Filed Feb. 4, 1929
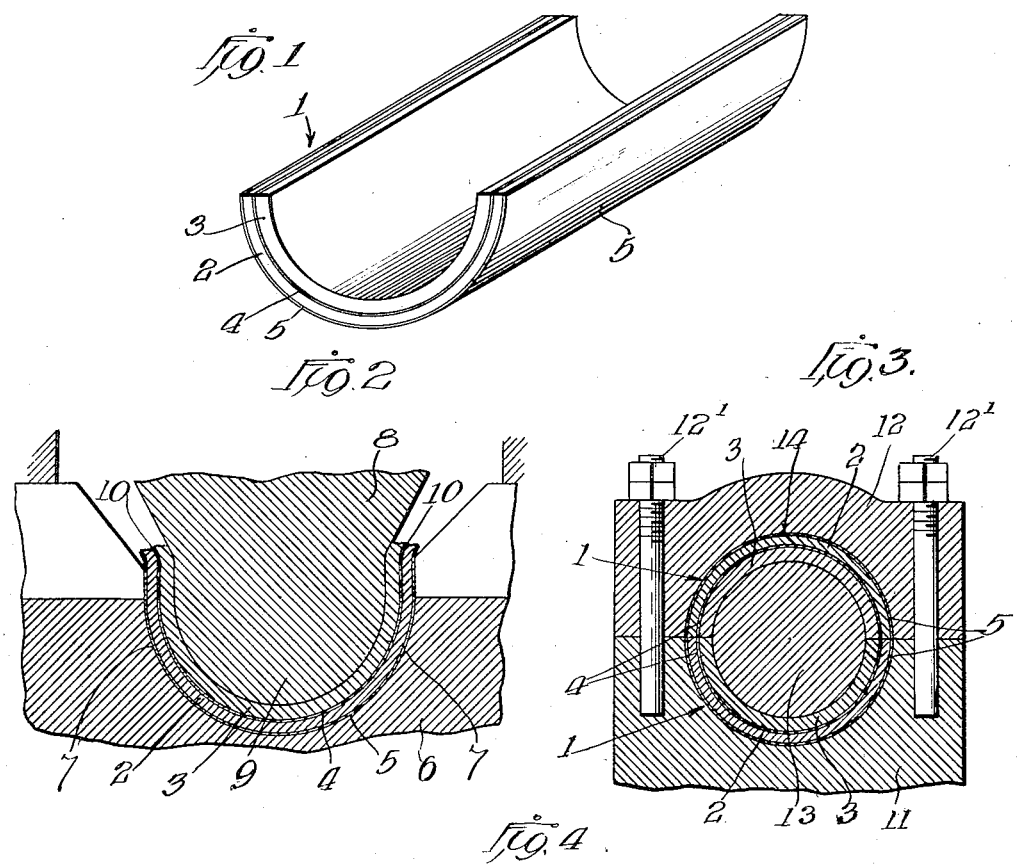

Patented Aug. 14, 1934

1,970,024

UNITED STATES PATENT OFFICE 1,970,024

BEARING SLEEVE

Berger Stockfleth, Niles, Mich., assignor, by mesne assignments, to The Cleveland Graphite Bronze Company, Cleveland, Ohio, a corporation of Ohio Application February 4, 1929, Serial No. 337,432

7 Claims. (Cl. 308—237)

This invention relates to improvements in renewable bearing shells or sleeves and their manufacture.

In United States Patent No. 1,492,119 issued to Frederick W. Burger and myself, there is shown a method of making such bearing shells or sleeves with steel or some other relatively hard backing and a babbitt metal or other relatively soft bearing metal lining by a pressure process as distinguished from the usual cutting or machining processes, and in my copending application, Serial No. 300,757, filed August 20, 1928, I have shown an improved method of applying the bearing metal lining to the backing.

This present invention relates particularly to improvements in such pressure process and products.

The object of this invention is not only to provide improved methods, particularly as related to such shells which have steel or similar relatively hard metal backs lined with babbitt or a similar relatively soft bearing metal but also an improved bearing sleeve of this character.

Usually, in the production of steel backed bearing sleeves, the steel backs are first formed roughly to size but of large enough dimensions to permit the usual machining for sizing and finishing same. These rough backs are dipped in melted tin as a preliminary step to provide them with the babbitt metal lining. Then, in the usual machining process for finishing the rough bearing to size, the thin coating of tin on the back of the steel backing is removed, and the bearing sleeve thus produced presents a hard steel surface to the housing in which it is placed. Such housings are more or less rough on the bearing receiving surface, at least they present more or less coarse tool marks, and the ordinaray steel backed bearing does not make anywhere near a 100 per cent contact with the surface of the housing, no matter how smoothly the bearing may be finished.

By means of my present invention, I am enabled to provide a shell which will give practically a substantially 100 per cent contact between the shell and the housing, resulting in a better dissipation of heat from the bearing into the housing. Furthermore, the sizing and finishing of such a sleeve in the pressure dies causes a minimum of wear on the surface of the dies, as the relatively soft tin coating on the outer surface of the steel shell is more readily conformed to the shape and surface of the dies than the harder steel backing.

The fact that the tin coating remains on the outer surface of the finished shell is the feature which results in the substantially 100 per cent contact between the shell and the housing for the reason that when the complete bearing consisting of the lower and upper half cylinders are clamped into the housing by the bolting down of the housing cap, the relatively soft tin coating is pressed into all slight irregularities in the housing, such as tool marks etc. This forming of the bearing shell into the tool marks, etc. in the housing results in another valuable feature; that is, the secure retention of the bearing shells in their positions, once they are set and the free transmission of heat from the mounted shaft to the housing.

I have found that these bearings are more quickly run in; that is, brought to perfect working condition, and that they run much cooler than bearings which do not have the tinned outer surface on the finished bearing.

In the practical operation of this method of producing bearings, the steel back is actually elongated circumferentially and in such elongation the intermediate film of tin prevents the erosion which the bare steel would cause. This is highly important for the reason that, the sleeves being finished in the dies and having to be sized within a certain very small tolerance, any perceptible wear or erosion of the dies is fatal to the production of bearings with sufficient accuracy.

Another advantage which results from this present invention is that the steel backs of the sleeves are protected by the tin coating, which remains on them, against rusting after having been finished and before and during use.

My invention will be more readily understood by reference to the accompanying drawing forming part of this specification and in which—

Fig. 1 is a perspective view of a finished half shell or bearing sleeve made in accordance with my invention and shown as it appears before it has been placed in a bearing housing;

Fig. 2 is a cross-section of the forming dies, showing the process of manufacture;

Fig. 3 is a cross-section of a bearing housing showing a pair of half cylindrical sleeves in place;

Fig. 4 is a side view of a half sleeve as it appears after it has been used in a bearing housing; and Fig. 5 is a longitudinal central section of the sleeve shown in Fig. 4.

In said drawing 1 illustrates one of my improved removable bearing liners. The liner as shown is half cylindrical in form and consists mainly of a relatively harder back or shell 2 and an inner lining 3 of a relatively softer bearing metal such as babbitt metal.

In the method of manufacture described in my said co-pending application, I have described a means of applying the bearing metal lining to the backing 2, which includes the step of coating the backing member with tin or some similar bonding metal before adding the bearing metal lining.

This present invention is similar in that I first coat the back 2 with tin or some similar bonding metal. This coating is indicated on the inside at 4 by a relatively heavy line and on the outside at 5 by a similar heavy line. It should be understood that the thickness of the tin coating is exaggerated to some extent, as in actual practice it is not very thick.

In producing such bearing sleeves, the harder metal back 2 is dipped into molten bonding metal such as thin, having first been properly cleaned to cause the tin to adhere thereto, thus coating the shell 2 over its entire surface. The next step is to add the inner lining of bearing metal, preferably as described in my co-pending application supra. Then the sleeve is sized and accurately formed in the pressing operation, as shown in Fig. 2 of the drawing. The shell is placed in a die member 6 having a suitable half cylindrical opening 7 and a plunger die member 8 having a half cylindrical end 9, is forced into the interior of the bearing shell with pressure sufficient to form and size the shell, actually causing the elongation circumferentially of the backing and the lining as shown at the sides at 10, causing them to exude from the die space between the two die members. In this operation the tin coating 5 on the outer surface of the bearing sleeve is, of course, compacted and made very smooth, and the sleeve is otherwise accurately sized.

In Fig. 3 I have illustrated an ordinary bearing housing consisting of a lower fixed part 11 and an upper removable cap 12 held in place upon the lower part by bolts 12'. The housing has a bearing opening 14 in which a bearing sleeve made up of two of the half sleeves 1 accurately fit. The cylindrical sleeve thus formed receives a shaft 13 within it. The shaft fits within the bearing sleeve with the proper allowance for the film of lubricating oil to be maintained between them.

It is well known that the surface of the cylindrical opening 14 in the housing is more or less rough; that is, it is not an accurately finished smooth surface such as is usual in die members. When the cylindrical bearing sleeve is clamped tightly in the housing, the tin on the outer surface of the sleeve is pressed against this relatively rough surface. At first the contact between the smooth outer surface of the sleeve and the inner surface of the housing is not a complete 100 per cent contact, owing to the inaccuracies of the housing surface, but as the bearing is "run in"; that is, as the shaft 13 is rotated and the cap is tightened down, the tin on the outer surface of the sleeve is forced into the depressions in the surface of the housing, thus causing or producing a substantially complete 100 per cent contact between the sleeve and the housing. In Figs. 4 and 5 I have illustrated the appearance of the outer surface of the sleeve after it has been conformed to the surface of the housing. In this instance, I have presumed that the tool marks left by the boring tool in the housing formed slight inaccuracies into which the relatively soft tin coating 5 has been formed, as shown at 15.

Once the sleeve has been thus conformed to the housing, it remains in this condition throughout its life, as the area of contact is sufficient to prevent any squeezing out of the tin. This complete contact of the bearing sleeve with the housing is completed in a relatively short running of the shaft, thus saving a great deal of time and expense in the "running in" operation. Furthermore, the contact is much more complete than that produced either with bronze or steel backs, due to the relatively soft contact metal, viz. tin, which I use. Also, the contact being thus metallically complete, I provide the limit of conductivity for carrying heat away from the bearing into the housing, thus assisting materially in the provision of cool running bearings.

It should be understood that in the old or former methods of manufacture of bearing sleeves the provision of this thin and uniform coating of tin could not be produced.

As many modifications of the invention will readily suggest themselves to one skilled in the art, I do not limit or confine my invention to the specific details of construction or arrangement of parts herein shown and described.

I claim:

1. The combination with a pair of co-operating half-cylindrical bearing sleeves, each consisting of a relatively rigid, relatively hard metal back and a bearing metal lining and a coating of relatively soft metal on the convex surface of the back, and a bearing housing consisting of two parts adapted to be bolted together, upon a pair of the sleeves, the soft metal coating on the convex surfaces of the sleeves being adapted to be conformed to and with the contacting surface of the housing by the pressure produced in securing the two parts together.

2. A bearing housing having a bearing opening, the inner surface of which is more or less pitted or rough, in combination with a bearing sleeve in the opening the sleeve comprising a relatively rigid harder metal back and a bearing metal lining and a coating of relatively soft metal on the outer surface of the back, the soft metal coating conformed to and wtih the rough or pitted surface of the housing.

3. The improvements herein described and comprising a finished and sized bearing lining or sleeve having a backing of relatively hard metal and an interior surface of a relatively softer bearing metal, the backing being coated on its outer surface with a relatively softer metal, such as tin, as and for the purpose specified.

4. The improvements herein described and comprising a finished bearing lining or sleeve having a backing of relatively hard metal such as steel, the backing being coated on its outer surface with a relatively softer metal, such as tin, as and for the purpose specified.

5. A renewable bearing shell comprising an inner layer of a bearing metal such as babbitt metal, a backing of a harder metal such as steel, and the outer surface of the backing coated with a relatively softer metal such as tin, the whole formed into finished shape by pressure in suitable dies.

6. A bearing sleeve having a relatively thin coating of a relatively soft metal such as tin on its outer surface adapted to be conformed to the interior surface of a bearing housing in use.

7. The improvement herein described and comprising a finished and sized bearing sleeve having a relatively soft metal surface both inside and outside and an intermediate reinforcing member of a harder, more rigid metal such as steel, the reinforcing member being substantially continuous throughout the dimensions of the sleeve both longitudinally and circumferentially, and the outer layer of the softer metal being quite thin.

BERGER STOCKFLETH.